May 15, 1928.
J. R. SCHERER
1,669,578
WHEEL ANCHORING DEVICE
Filed April 3, 1925
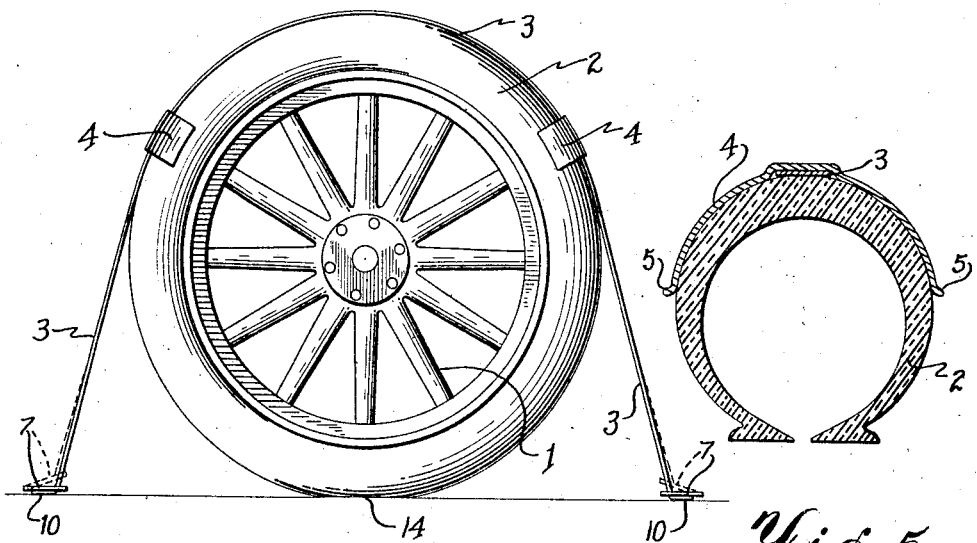
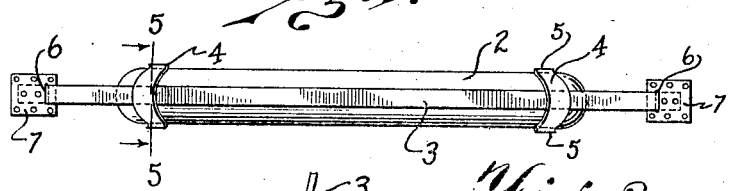
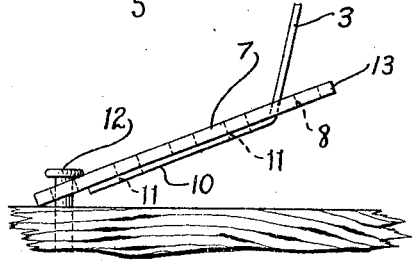
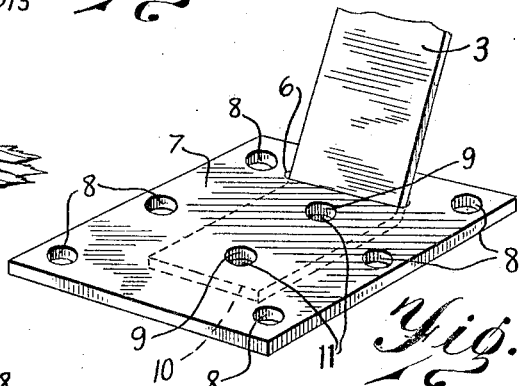
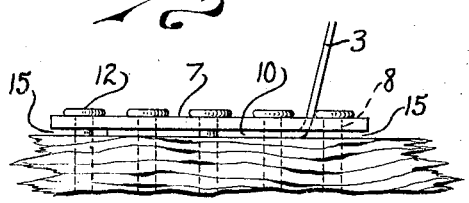
INVENTOR.
John. R. Scherer.
BY
ATTORNEY.

Patented May 15, 1928.

1,669,578

UNITED STATES PATENT OFFICE.

JOHN R. SCHERER, OF DETROIT, MICHIGAN, ASSIGNOR TO THE EVANS AUTO LOADING CO., INC., OF DETROIT, MICHIGAN, A CORPORATION OF DELAWARE.

WHEEL-ANCHORING DEVICE.

Application filed April 3, 1925. Serial No. 20,340.

This invention relates to wheel anchoring devices and the object of the invention is to provide a wheel anchoring device for securing automobiles for shipment to prevent movement thereof. Another object of the invention is to provide a wheel anchoring device which can be used with either wire, wood or disc wheels and which will not mar the wheel with which it is used. A further object of the invention is to provide a wheel anchoring device with which the wheel may be drawn down to tight engagement with the floor the said device being in the shape of an inverted U and partially encircling the tire of the wheel. Another object of the invention is to provide a wheel anchoring device formed from strap iron and carrying tire engaging members thereon, the ends of the said strap iron being drawn down tightly to the supporting floor in order to tightly engage the wheel. A still further object of the invention is to provide a foot for each end of the strap iron whereby the strap iron may be drawn down to very tight engagement with the tire when the feet are being nailed to the floor. These objects and the several novel features of the invention are hereinafter more fully described and claimed and the preferred form of construction by which these objects are attained is shown in the accompanying drawings in which—

Fig. 1 is a side elevation of an automobile wheel showing my improved wheel anchoring device secured thereto.

Fig. 2 is a plan view of the wheel with the device secured thereto.

Figs. 3 and 4 show the method of nailing the device to the floor.

Fig. 5 is an enlarged section taken on line 5—5 of Fig. 2.

Fig. 6 is a perspective view of one of the anchoring feet.

This device is to be used for securing an automobile for shipment to prevent movement thereof and there are four devices provided for each automobile, one for each of the four wheels thereof. As shown in Fig. 1 the wheel 1 of the automobile is provided with an inflated pneumatic tire 2. The wheel anchoring device comprises a member 3 formed of strap iron which extends from the floor of the freight car in which the vehicle is shipped up and around the tire 2 and back to the floor on the opposite side. This strap iron member 3 must be held centrally on the periphery of the tire 2 and for this reason I provide a pair of substantially arcuate members 4 which are welded or riveted to the strap iron 3 as shown in Fig. 5. The members 4 fit the outer face of the tire and are provided with outwardly rolled edges 5 to prevent the same from cutting into the tire. At each end the strap iron is inserted through a slot 6 in a securing plate 7 which is provided with a series of apertures 8 for securing the same to the floor. The plate 7 is also provided with a pair of apertures 9 in the center and the bent end 10 of the strap iron 3 beneath the plate 7 is provided with a pair of apertures 11 in the center in alignment with the apertures 9. To secure the device to the floor a pair of nails 12 are inserted through the two apertures 8 in the end of each foot plate as shown in Fig. 3 and are driven down it being necessary that the ends of the strap iron be drawn fairly tight before the nailing is commenced. At this time the ends of the anchoring device are in the position shown in dotted lines in Fig. 1 and in Fig. 3 and the nailing is continued by inserting nails in the remaining apertures and driving them down to secure the device as shown in Fig. 4. As the edge 13 of the plate 7, as shown in Fig. 3, is drawn downwardly to the position shown in Fig. 4 the strap iron 3 is drawn downwardly and for this reason the nailing should be done at both ends alternately to draw the ends of the strap iron down equally. This puts sufficient pressure on the wheel to flatten the tire slightly at 14 as shown in Fig. 1 and for this reason the wheels of the vehicle cannot move when so secured. It will be noted that when the plate is secured to the floor by reason of the bent end 10 of the strap iron 3, the plate is supported slightly above the floor so that it is very easy to insert a crow bar or lever in the space 15 beneath the nailing plate as shown in Fig. 4 to pry the plate loose and remove the wheel anchoring device. It will also be noted that the substantially arcuate members 4 center the strap iron on the tire and by this construction which engages the tire only it is impossible to mar the wheels or the vehicle and at the same time the wheels are rigidly held from movement. From this it will be seen that the forward or steering wheels of the vehicle are rigidly held in place by the arcuate members 4 so that the said wheels cannot be turned on their spindles so as to come free from the wheel anchoring device. The difficulty with blocking the wheels as has heretofore been the practice is that the wheels from the jarring and shaking during shipment often become turned so that the blocks have no effect in blocking the wheels.

From the foregoing description it becomes evident that the device is very simple and efficient in operation, will not easily get out of order, may be easily secured in position or removed, is composed of few parts, and is of consequent low manufacturing cost, may be used with wire, wood or disc wheels with equal efficiency, and provides a device which accomplishes the objects described.

Having thus fully described my invention, its utility and mode of operation, what I claim and desire to secure by Letters Patent of the United States is—

In a device for anchoring a pneumatic tired wheel to a supporting surface, the combination with the wheel and its supporting surface, of a substantially flat strip of metal bent longitudinally in the form of a U adapted to be placed over the upper portion of a tire and having its opposite ends formed with integral feet bent to extend at an angle to the body portion, the bend at each end of the strip when mounted on the wheel being a slight distance above the supporting surface, a nailing plate for securing each of said foot portion to the vertical surface, the nailing of the plate drawing the bent point to contact with said supporting surface and exerting pressure upon the tire, and retaining means on the strip engaging about the tire to prevent displacement of the strip.

In testimony whereof, I sign this specification.

JOHN R. SCHERER.